J. BJORNLIE.
RIM CONTRACTOR AND EXPANDER.
APPLICATION FILED FEB. 5, 1920.
1,399,185. Patented Dec. 6, 1921.
2 SHEETS—SHEET 1.
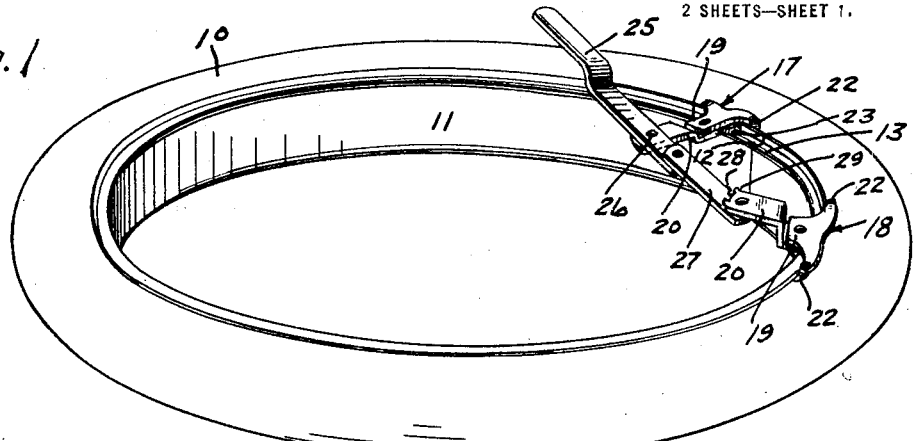
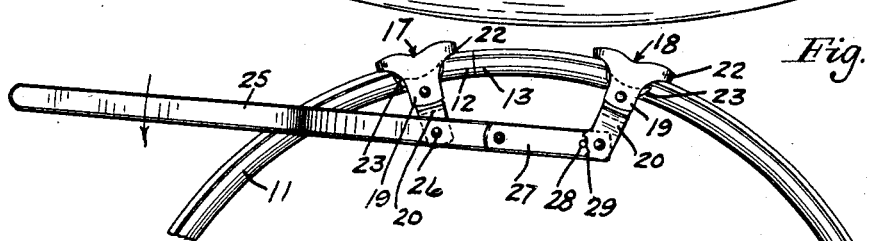
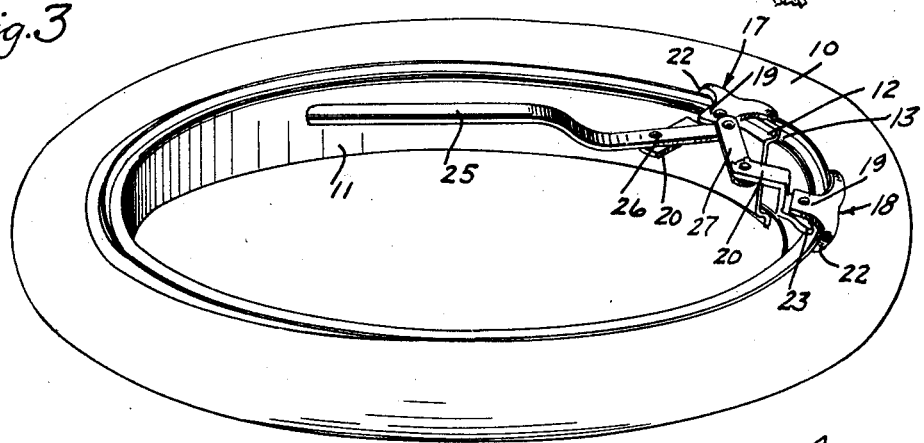
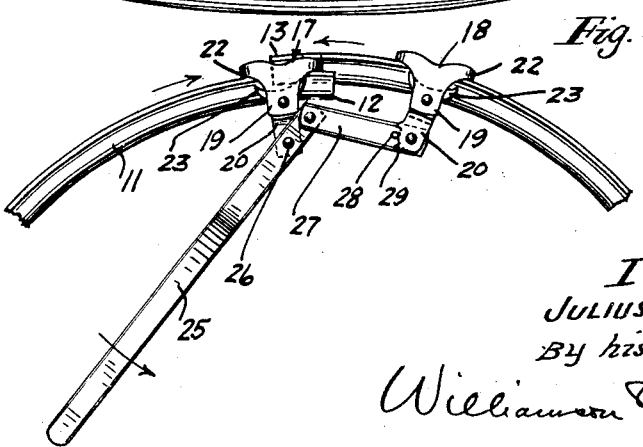
Inventor
JULIUS BJORNLIE
By his Attorneys
Williamson Merchant

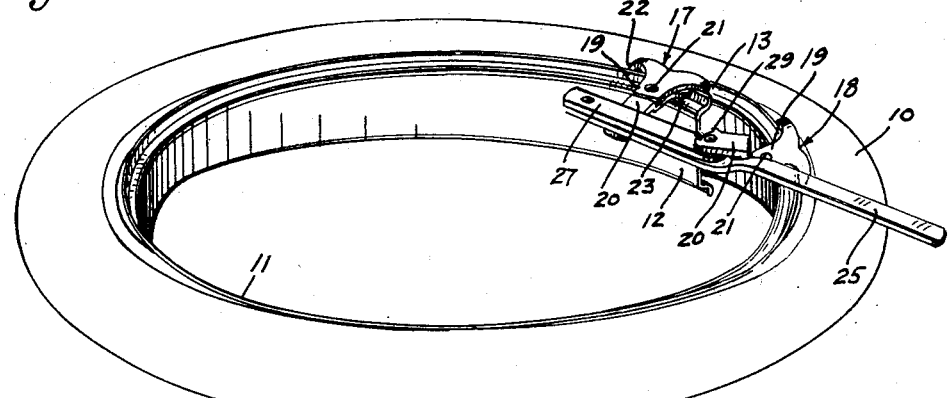
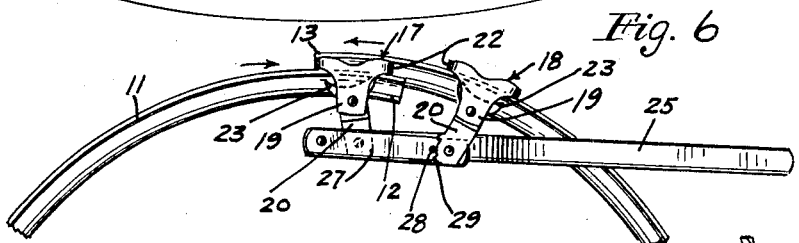
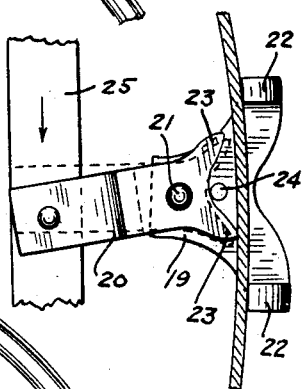
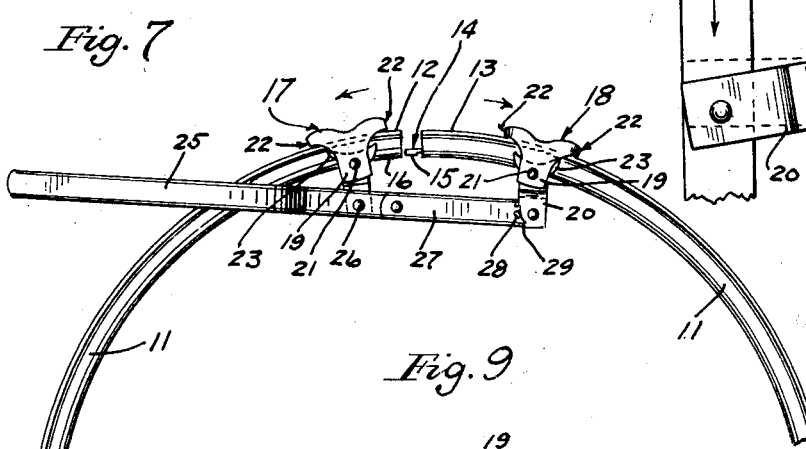
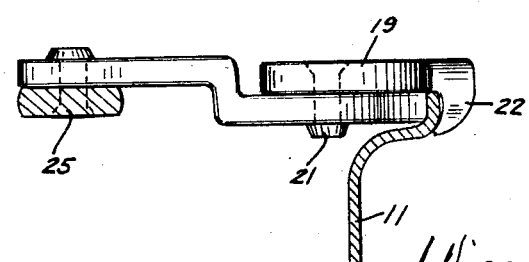

UNITED STATES PATENT OFFICE.

JULIUS BJORNLIE, OF WATERTOWN, SOUTH DAKOTA, ASSIGNOR TO BJORNLIE MANUFACTURING COMPANY, OF WATERTOWN, SOUTH DAKOTA, A CORPORATION OF SOUTH DAKOTA.

RIM CONTRACTOR AND EXPANDER.

1,399,185.   Specification of Letters Patent.   Patented Dec. 6, 1921.

Application filed February 5, 1920. Serial No. 356,381.

*To all whom it may concern:*

Be it known that I, JULIUS BJORNLIE, a citizen of the United States, residing at Watertown, in the county of Codington and State of South Dakota, have invented certain new and useful Improvements in Rim Contractors and Expanders; and I do hereby declare the following to be a full, clear, and exact description of the invention, such as will enable others skilled in the art to which it appertains to make and use the same.

My present invention relates to a tool or device for contracting and expanding transversely split demountable rims for automobile and like vehicle wheels, and has for its primary object to provide such a tool that is reliable and effective in action, and by means of which the ends of a rim may be easily and conveniently manipulated for the purpose of unlocking and contracting the rim for the application or removal of a tire, and the subsequent expanding and re-locking of the rim to hold the tire thereon.

The improved tool may be used in contracting and expanding transversely divided rims, either of the type in which the ends of the rim are relatively movable radially with respect thereto for locking and unlocking, or in which the ends of the rim are locked and unlocked by a relative circumferential or spreading movement of the rim prior to the expansion or contraction thereof.

The device is applicable to rims of different diameters, and by means of which a degree of force may be applied in manipulating the ends of the rim without great effort on the part of the operator.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:—

Figure 1 is a perspective view of a transversely split demountable wheel rim having a pneumatic tire mounted thereon, and to which rim is applied the improved tool in position to unlock and contract the same;

Fig. 2 is a side elevation of the improved tool, as applied in Fig. 1, a portion of the rim being broken away and the tire removed therefrom;

Fig 3 is a view corresponding to Fig. 1, with the exception that the tool has been manipulated to separate the ends of the rim and partly contract the same;

Fig. 4 is a view corresponding to Fig. 2, but illustrating the tool as positioned in Fig. 3;

Fig. 5 is a view corresponding to Fig. 3, with the exception that the tool has been further manipulated to completely contract the rim;

Fig. 6 is a view corresponding to Fig. 4, but illustrating the tool as positioned in Fig. 5;

Fig. 7 is a view corresponding to Fig. 2, with the exception that the tool is applied thereto to expand the rim and interlock the split ends thereof;

Fig. 8 is an inside elevation of one of the rim grapples and connected portion of the operating lever, together with a portion of the rim in circumferential section on an enlarged scale; and Fig. 9 is an edge elevation of the tool as shown in Fig. 8.

The numeral 10 indicates a pneumatic tire, and the numeral 11 indicates a transversely divided demountable wheel rim, the ends of which, for convenience of description, may be termed relatively fixed and movable and designated by the numerals 12 and 13, respectively. These rim ends 12 and 13 are, as shown, separated by a straight, transverse slit or cleft, the walls of which are arranged to directly abut when the rim is in an expanded position. The rim 13 is provided with a locking device in the form of a plate 14, which is designed to overlap the rim end 12 and has a projection 15 arranged to enter a keeper opening 16 in the rim end 12 to hold the rim ends against circumferential and lateral displacement when the rim is expanded and may be held against radial separation therefrom by the commonly used turn-button, not shown, arranged to overlap said projection. It is important to note that, in this construction of slit rim the ends thereof, when locked, are required to be displaced in a radial direction from an unlocking action prior to contraction of the rim.

The improved tool includes two rim grapples 17 and 18 adapted to be applied to the rim ends 12 and 13, respectively. Each rim grapple comprises a head 19 and an arm 20 intermediately connected to said head by a pivot 21 for circumferential swinging movement in respect to the rim 11, and it is important to note that when the grapples are applied to the rim, the same project radially inward. On the outer end of the head 19 is formed a pair of circumferentially spaced bearing lugs 22 located on opposite sides of the pivot 21 and arranged to engage the outer face of the rim 11 at one edge thereof. Formed on the short or outer end of the arm 20 is a pair of circumferentially spaced rim-engaging teeth 23, arranged to engage the inner face of said rim between the bearing lugs 22 and on opposite sides of the pivot 21. A stop pin 24, secured to the head 19, extends between the teeth 23 and limits the swinging movement of the arm 20. By reference to Fig. 9, it will be noted that the rim-engaging surfaces of the bearing lugs 22 are made slightly concave so as to substantially follow the contour of the engaged portion of the rim 11 and thereby more securely hold the tool to the rim against lateral separation therefrom.

An operating lever 25 is intermediately fulcrumed at 26 to the inner end of the arm 20 of the grapple 17. The short end of the lever 25 is pivotally connected to the arm 20 of the grapple 18 by a link 27. It will be noted that the lever 25 is laterally offset so as to freely work at one side of the rim and tire. A pin 28, on the link 27, works between lugs 29 on the rim 20 of the grapple 18, to prevent extreme movements of the link, but, at the same time, keep the said grapple in its proper relation to said link.

To contract the rim 11 for the purpose of removing the tire 10 therefrom, the improved tool is applied to the rim ends, as shown in Figs. 1 and 2. When the tool is thus applied, the lever 25 is substantially in alinement with the link 27 and forms an extension thereof. The initial movement of the lever 25, in the direction of the arrow marked thereon in Fig. 2, will buckle the said lever and link and thereby rock the arms 20 toward each other, thus causing the two teeth 23, nearest the slit in the rim, to bite against the inner face of the rim 11 and, together with the bearing lugs 22, securely anchor the heads 17 and 18 to the rim. A further movement of the lever 25, in the direction of the arrow marked on Fig. 2, will cause the heads 17 and 18 to radially separate the ends of the rim so as to lift the projection 15 out of the opening 16 and thereby unlock the rim ends. Continued movement of the lever 25, as indicated in Fig. 4, will fully contract the rim, and after said lever has been moved substantially 190 degrees and at the limit of said movement, the lever will be in overlapped relation with the link 27, as shown in Fig. 6. With the rim thus contracted, the operator may freely remove the tire therefrom.

To apply a tire to the rim when the same is contracted, the tool is applied to the rim ends with the lever 25 and link 27 in buckled relation. The initial movement of the lever, to straighten said lever and link, will separate the arms 20 and thereby cause the two teeth 23 farthest from each other, or the slit, to bite against the inner face of the rim 11, and, together with the bearing lugs 22, securely lock the heads 17 and 18 to the rim. Continued movement of the lever 25, in the same direction, will separate the ends of the rim to permit the same to move radially past each other and thereby cause the projection 15 to enter the opening 16 and thereby lock the rim ends together. A slight backward movement of the lever 25 will disengage the interlocked heads with the rim and permit the tool to be removed from the rim.

From the above description, it is evident that the improved tool may be very quickly applied to a rim or removed therefrom without the use of screws or other clamping devices, which must be independently operated to secure the tool to a rim.

What I claim is:—

1. A rim breaking tool comprising a pair of grapples, each comprising a head and an arm pivoted thereto and having opposing lateral lugs and end faces providing a laterally open unobstructed space to receive a rim flange, and a lever pivoted intermediately to one of said arms and a rigid link pivoted to the end of said lever and to the other of said arms whereby the tool may be imposed upon the rim flange by a simple lateral motion, and by a single full swing of the lever, the rim ends may be first separated, then relatively displaced radially and then circumferentially by the operation only of the elements named.

2. A rim breaking tool having a pair of grapples, each comprising an arm having spaced outwardly projecting teeth, and a head pivoted thereto having spaced lugs located at each side of said teeth, the teeth and lugs having opposing faces and providing a laterally open unobstructed space therebetween adapted to receive a rim flange, a lever to which one of said arms is pivoted adjacent the end thereof, a link pivoted to the end of the lever and to the other end of which the other of said arms is pivoted, whereby the tool may be imposed upon the rim flange by a simple lateral motion, and by a single full swing of the lever, the rim ends may be first separated, then relatively displaced radially and then circumferentially by the operation only of the elements named.

3. The structure set forth in claim 2, the heads of the grapples having a pin secured thereto and disposed between the teeth of said arm for limiting the movement of said head relatively to said arm, the gripping face of the teeth on said arms and lugs on said heads being substantially in the same plane.

In testimony whereof I affix my signature in presence of two witnesses.

JULIUS BJORNLIE.

Witnesses:
 WINIFRED I. WARD,
 HARRY D. KILGORE.